(12) United States Patent
Masuda (10) Patent No.: US 10,966,901 B2
(45) Date of Patent: Apr. 6, 2021

(54) MASSAGE SYSTEM

(71) Applicant: FUJI MEDICAL INSTRUMENTS MFG. CO., LTD., Osaka (JP)

(72) Inventor: Masaaki Masuda, Osaka (JP)

(73) Assignee: FUJI MEDICAL INSTRUMENTS MFG. CO., LTD., Osaka (JP)

( * ) Notice: Subject to any disclaimer, the term of this patent is extended or adjusted under 35 U.S.C. 154(b) by 234 days.

(21) Appl. No.: 15/878,690

(22) Filed: Jan. 24, 2018

(65) Prior Publication Data

US 2018/0250190 A1    Sep. 6, 2018

(30) Foreign Application Priority Data

Mar. 2, 2017    (JP) .............................. JP2017-039780

(51) Int. Cl.
| | |
|---|---|
| *A61H 9/00* | (2006.01) |
| *G06F 1/16* | (2006.01) |
| *G06F 3/01* | (2006.01) |
| *A61H 7/00* | (2006.01) |

(52) U.S. Cl.
CPC .......... *A61H 9/0078* (2013.01); *A61H 7/007* (2013.01); *G06F 1/163* (2013.01); *G06F 3/011* (2013.01);
(Continued)

(58) Field of Classification Search
CPC .......... A61H 1/00; A61H 7/007; A61H 7/008; A61H 9/00; A61H 9/0007; A61H 9/005; A61H 9/0078; A61H 9/0085; A61H 9/0092; A61H 39/04; A61H 2201/0138; A61H 2201/0149; A61H 2201/12; A61H 2201/1238; A61H 2201/1604;
(Continued)

(56) References Cited

U.S. PATENT DOCUMENTS

| | | | | |
|---|---|---|---|---|
| 5,857,986 | A * | 1/1999 | Moriyasu | ............... A61H 23/02 273/148 B |
| 5,903,395 | A * | 5/1999 | Rallison | ............. G02B 27/0172 345/8 |

(Continued)

FOREIGN PATENT DOCUMENTS

| | | |
|---|---|---|
| CN | 201223711 Y | 4/2009 |
| CN | 105056468 A | 11/2015 |

(Continued)

OTHER PUBLICATIONS

JPO, Japanese Office Action(with English translation) dated Oct. 29, 2020, issued in Japanese Application No. 2017-039780, 4 pages.
(Continued)

*Primary Examiner* — Justine R Yu
*Assistant Examiner* — Matthew D Ziegler
(74) *Attorney, Agent, or Firm* — Masuvalley & Partners (57) ABSTRACT

A massage system includes a chair type massage machine that performs a massage on a person to be treated, a head mounted display (head worn type display device) that is worn on a head portion of the person to be treated, and a controller, which, when the massage is being performed by the massage machine on the person to be treated, makes a video image, including a moving image of a virtual practitioner performing the massage, be displayed on the head mounted display.

4 Claims, 7 Drawing Sheets

(52) U.S. Cl.
CPC ............ *A61H 2201/0149* (2013.01); *A61H 2201/1604* (2013.01); *A61H 2201/164* (2013.01); *A61H 2201/1614* (2013.01); *A61H 2201/1623* (2013.01); *A61H 2201/1633* (2013.01); *A61H 2201/1635* (2013.01); *A61H 2201/1669* (2013.01); *A61H 2201/5007* (2013.01); *A61H 2201/5025* (2013.01); *A61H 2201/5035* (2013.01); *A61H 2201/5043* (2013.01); *A61H 2203/0425* (2013.01); *A61H 2203/0431* (2013.01); *A61H 2205/04* (2013.01); *A61H 2205/06* (2013.01); *A61H 2205/062* (2013.01); *A61H 2205/065* (2013.01); *A61H 2205/081* (2013.01); *A61H 2205/088* (2013.01); *A61H 2205/106* (2013.01); *A61H 2205/108* (2013.01); *A61H 2205/12* (2013.01)

(58) Field of Classification Search
CPC .... A61H 2201/1614; A61H 2201/1623; A61H 2201/1633; A61H 2201/1635; A61H 2201/164; A61H 2201/1669; A61H 2201/50; A61H 2201/5002; A61H 2201/5007; A61H 2201/5025; A61H 2201/5035; A61H 2201/5043; A61H 2203/0425; A61H 2203/0431; A61H 2205/04; A61H 2205/06; A61H 2205/062; A61H 2205/065; A61H 2205/081; A61H 2205/088; A61H 2205/10; A61H 2205/106; A61H 2205/108; A61H 2205/12; A61H 2205/125; G06F 1/163; G06F 3/011
See application file for complete search history.

(56) References Cited

U.S. PATENT DOCUMENTS

| | | | | |
|---|---|---|---|---|
| 6,123,661 A * | 9/2000 | Fukushima | ........... | A61M 21/00 600/26 |
| 6,273,865 B1 * | 8/2001 | Perez | ................ | A61G 15/007 601/46 |
| 10,617,956 B2 * | 4/2020 | Black | ................ | A63F 13/212 |
| 2004/0097851 A1 * | 5/2004 | Inada | ................ | A61H 23/0254 601/47 |
| 2007/0273180 A1 * | 11/2007 | Tanizawa | ............. | A47C 1/02 297/85 M |
| 2008/0269629 A1 * | 10/2008 | Reiner | ................ | A61B 5/165 600/544 |
| 2009/0023122 A1 * | 1/2009 | Lieberman | .......... | G09B 19/003 434/258 |
| 2009/0156886 A1 * | 6/2009 | Burgio | ................ | A61B 5/224 600/27 |
| 2011/0055720 A1 * | 3/2011 | Potter | .................. | G06F 3/017 715/747 |
| 2011/0295165 A1 * | 12/2011 | Cavallaro | .......... | A61H 1/0274 601/33 |
| 2014/0153794 A1 * | 6/2014 | Varaklis | ............. | A61B 5/1124 382/128 |
| 2018/0113312 A1 * | 4/2018 | Jung | ................. | G02B 27/0172 |

FOREIGN PATENT DOCUMENTS

| | | |
|---|---|---|
| CN | 105521583 A | 4/2016 |
| JP | H06-000209 A | 1/1994 |
| JP | H09-313611 A | 12/1997 |
| JP | 2002-291824 A | 10/2002 |
| JP | 2003-275266 A | 9/2003 |
| JP | 2011-172642 A | 9/2011 |
| JP | 2012-135656 A | 4/2012 |
| JP | 2013-153969 A | 8/2013 |
| JP | 2014-094022 A | 5/2014 |
| KR | 20160148899 A | 12/2016 |
| WO | 2018/123281 A1 | 7/2018 |

OTHER PUBLICATIONS

Chinese Search Report was dated Sep. 13, 2020 in Chinese Application No. CN201810051496.3, 3 pages.
Chinese Office Action was dated Sep. 25, 2020 in Chinese Application No. CN201810051496.3, total 14 pages with translation.

* cited by examiner

MASSAGE SYSTEM

This application claims priority under 35 U.S.C. § 119 to Japanese patent application Serial No. 2017-039780, filed Mar. 2, 2017, which is incorporated herein by reference in its entirety.

BACKGROUND OF THE INVENTION

1. Field of the Invention

The present invention relates to a massage system that includes a massage machine, such as a chair type massage machine, etc., and a display device arranged to display a moving image.

2. Description of the Related Art

There is known a chair type massage machine that includes a seat portion, a backrest portion, an armrest portion, a footrest portion, and a base portion serving as a foundation for these portions. As such a chair type massage machine, there is that with which a massage unit, including a pair of right and left kneading balls, is mounted to the backrest portion so as to be capable of being raised and lowered. The massage unit includes a kneading mechanism that makes the kneading balls undergo eccentric rotation and a tapping mechanism that swings the kneading balls back and forth. The massage unit performs a tapping operation and a kneading operation on the neck, shoulders, back, waist portion, etc., of a person to be treated.

Also, as such a chair type massage machine, there is that with which a waist portion, the armrest portion, and the footrest portion are respectively provided with airbags. The airbags respectively provided at the waist portion, the armrest portion, and the footrest portion have flat forms when shrunk and are suitably inflated to apply pressing stimuli to the waist portion (thigh portions), arms, and leg portions of a person to be treated.

SUMMARY OF THE INVENTION

The inventor of preferred embodiments of the present invention described and claimed in the present application conducted an extensive study and research regarding a massage system, such as the one described above, and in doing so, discovered and first recognized new unique challenges and previously unrecognized possibilities for improvements as described in greater detail below.

An object of the present invention is to provide a massage system, with which a person to be treated can readily obtain a sensation as if being treated by a human being.

In order to overcome the previously unrecognized and unsolved challenges described above, a preferred embodiment of the present invention provides a massage system. The preferred embodiment of the present invention provides a massage system. The massage system includes a massage machine that performs a massage on a person to be treated, a display device, and a controller, which, when the massage is being performed by the massage machine on the person to be treated, makes a video image, including a moving image of a virtual practitioner performing the massage, be displayed on the display device.

With the present arrangement, when a massage is being performed by the massage machine on a person to be treated, a video image that includes a moving image of a virtual practitioner performing the massage is displayed on the display device and the person to be treated can readily obtain a sensation as if being treated by a human being.

In the preferred embodiment of the present invention, the display device displays the video image three-dimensionally.

In the preferred embodiment of the present invention, the display device is a head worn type display device that is worn on a head portion of the person to be treated.

In the preferred embodiment of the present invention, the head worn type display device includes at least one of either of a head tracking function and a position tracking function.

In the preferred embodiment of the present invention, the virtual practitioner is a person of an animation.

In the preferred embodiment of the present invention, the massage machine includes a function of performing an air massage using one or a plurality of airbags that are inflated and shrunk by supply and exhaust of air and a function of changing a supplying time of air to a certain airbag among the one or plurality of airbags to control the strength of the air massage using the airbag, and includes a reproduction speed control unit, which, when, during performing of an air massage using a certain airbag among the one or plurality of airbags, the strength of the air massage is changed, controls a reproduction speed of the video image so as to synchronize the video image with the air massage.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A preferred embodiment of the present invention shall now be described in detail with reference to the attached drawings.

Figure 1:
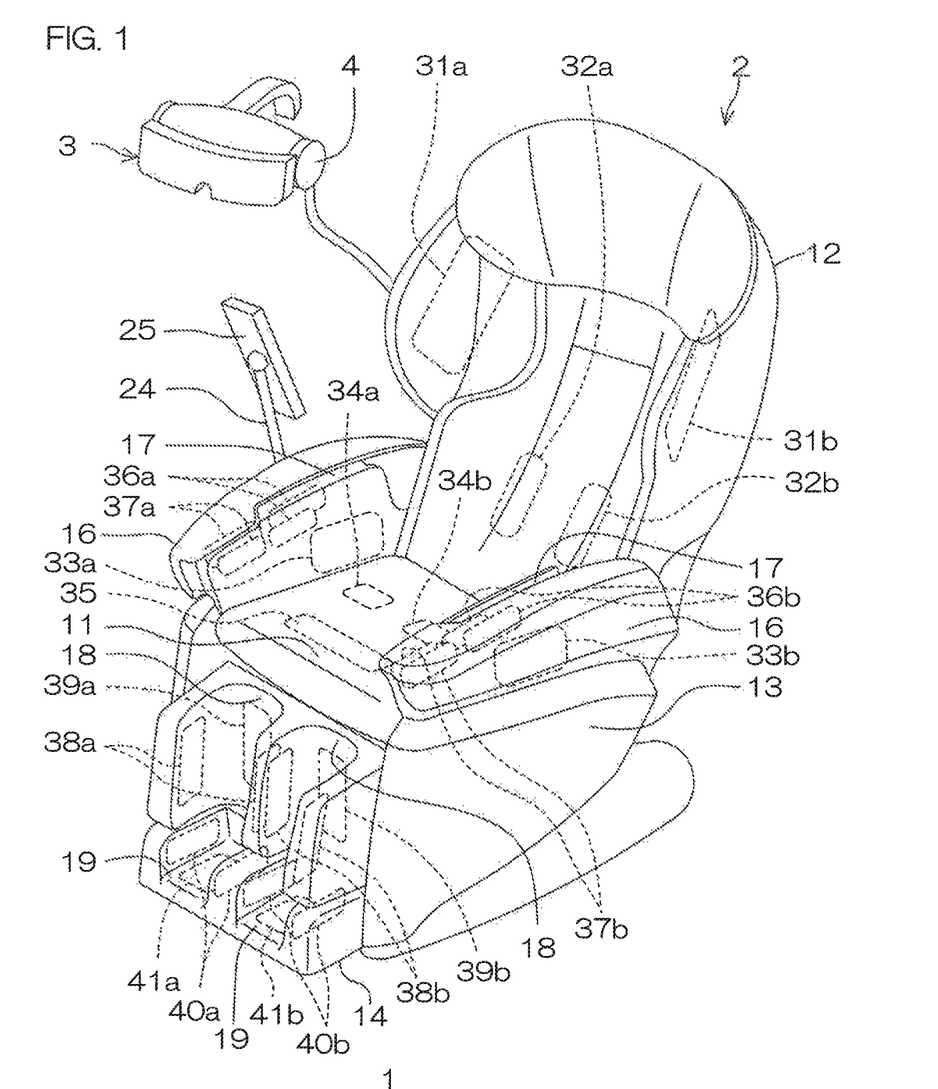
FIG. 1 is a perspective view of an outer appearance of a massage system.

FIG. 1 is a perspective view of an outer appearance of a massage system 1.

The massage system 1 includes a chair type massage machine 2, a head mounted display (HMD) 3, and headphones 4.

Figure 2:
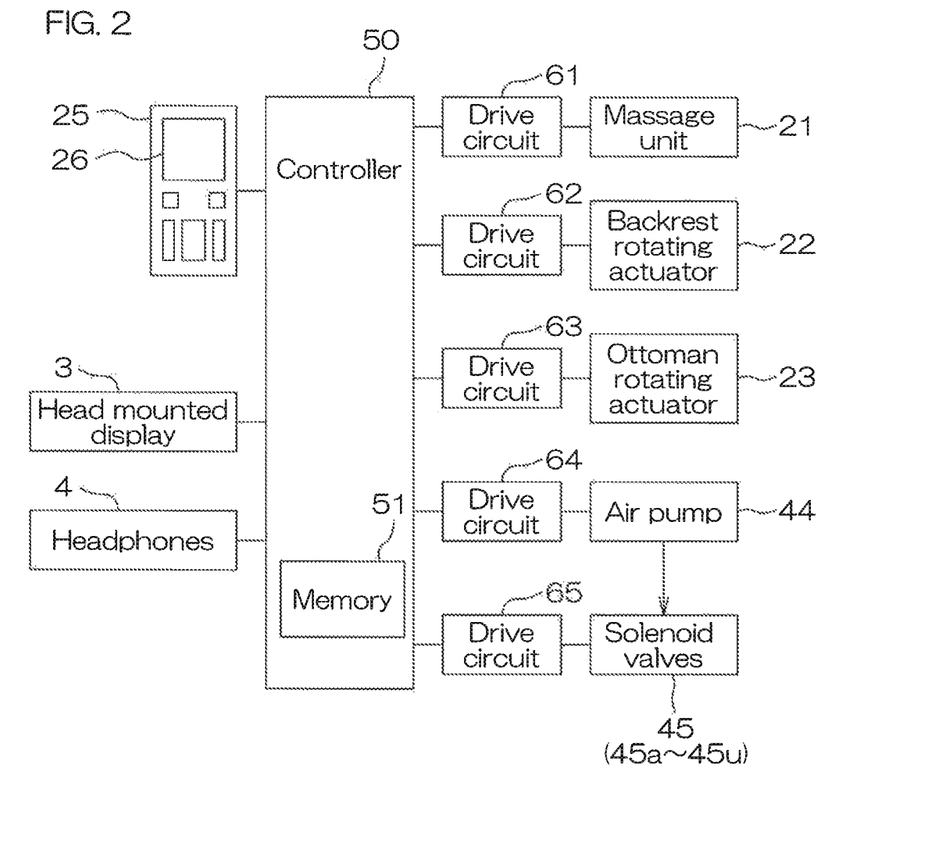
FIG. 2 is a block diagram of the electrical configuration of the massage system.

The chair type massage machine 2 includes a seat portion 11, a backrest portion 12, an armrest portion 13, an ottoman (footrest portion) 14, and a base serving as a foundation for these portions. In the description that follows, a front/rear direction, a right/left direction, and an up/down direction shall refer to a front/rear direction, a right/left direction, and an up/down direction as viewed by a person to be treated when the person to be treated is seated in an ordinary orientation on the chair type massage machine 2. Although the base is present below the seat portion 11, in FIG. 1, it is hidden by the seat portion 11, the backrest portion 12, the armrest portion 13, and the ottoman 14 and does not appear.

The seat portion 11 is disposed on the base. The backrest portion 12 is disposed at a rear of the seat portion 11. The armrest portion 13 is disposed at both right and left sides of the seat portion 11. The ottoman 14 is disposed at a front side of the seat portion 11. The backrest portion 12 is supported by a backrest rotating actuator 22 (see FIG. 2) so as to be tiltable with respect to the seat portion 11. Also, the ottoman 14 is made capable of being rotated around a support shaft, provided at a vicinity of a seat portion upper portion and extending in the right/left direction, as a center by an ottoman rotating actuator 23 (see FIG. 2). The ottoman 14 is thereby made capable of being rotated between a vertical orientation, shown in FIG. 1, and a horizontal orientation, rotated by substantially 90 degrees from the vertical orientation.

A massage unit 21 (see FIG. 2), arranged to perform various types of massage (mechanical massage) using kneading balls, is incorporated in the backrest portion 12. Although not shown, the backrest portion 12 is provided with a pair of right and left guide rails extending in the up/down direction, and the massage unit 21 is enabled to move in the up/down direction along the guide rails. As the massage unit 21, for example, a massage mechanism disclosed in Japanese Patent Application Publication No. 2012-135656 or a massage unit disclosed in Japanese Patent Application Publication No. 2013-153969 may be used.

The armrest portion 13 is provided with arm units 16 having forearm portion accommodating recesses 17 arranged to accommodate forearm portions of the person to be treated. The ottoman 14 has leg portion accommodating recesses 18 and foot accommodating recesses 19 respectively accommodating right and left leg portions and feet of the person to be treated.

The backrest portion 12, the seat portion 11, the armrest portion 13, and the ottoman 14 of the chair type massage machine 2 are provided with airbags. Each airbag is inflated and shrunk by intake and exhaust of air to perform air massage on the person to be treated.

A pair of right and left shoulder portion airbags 31*a* and 31*b*, arranged to massage right and left shoulder portions, and a pair of right and left waist portion airbags 32*a* and 32*b*, arranged to massage a waist portion, are provided at the backrest portion 12. A pair of right and left pelvis airbags 33*a* and 33*b*, arranged to massage both side portions around the pelvis, a pair of right and left hip portion airbags 34*a* and 34*b*, arranged to massage hip portions, and a thigh portion airbag 35, arranged to massage thigh portions, are provided at the seat portion 11.

Forearm portion airbags 36*a* and 36*b*, arranged to massage forearm portions, and hand airbags 37*a* and 37*b*, arranged to massage the hands, are provided at both side surfaces of the pair of right and left forearm portion accommodating recesses 17. Calf side airbags 38*a* and 38*b*, arranged to massage side surfaces of the calves, are provided at both side surfaces of the pair of right and left leg portion accommodating recesses 18. Calf back airbags 39*a* and 39*b*, arranged to massage back sides of the calves, are provided at bottom surfaces of the pair of right and left leg portion accommodating recesses 18.

Foot top airbags 40*a* and 40*b*, arranged to massage side portions of the tops of the feet, are provided at both side surfaces of the pair of right and left foot accommodating recesses 19. Foot sole airbags 41*a* and 41*b*, arranged to massage the soles of the feet, are provided at bottom surfaces of the pair of right and left foot accommodating recesses 19.

A remote stand 24 is mounted to an arm unit 16. A remote controller (hereinafter referred to as the "remote 25"), for operation of the chair type massage machine 2 by the person to be treated, is detachably mounted to the remote stand 24. As shown in FIG. 2, a liquid crystal display 26 and a plurality of operation keys are provided on an operation panel of the remote 25.

The head mounted display 3 is a head worn type display device that can be worn on the head of the person to be treated. In the present preferred embodiment, an arrangement that includes a head tracking function and a position tracking function and is capable of displaying a moving image three-dimensionally (for example, "OCULUS RIFT (registered trade name)" made by "OCULUS (registered trade name)", "VIVE (registered trade name)" made by "HTC (registered trade name)", "PLAYSTATION VR (registered trade name)" made by "SONY INTERRACTIVE ENTERTAINMENT (registered trade name)", etc.) is used as the head mounted display 3. The head tracking function refers to a function by which a video image changes in accordance with a direction of viewing (face direction), that is, with movement of the head, etc. The position tracking function refers to a function by which a video image changes in accordance with head position. The headphones 4 are mounted to the head mounted display 3.

Figure 3:
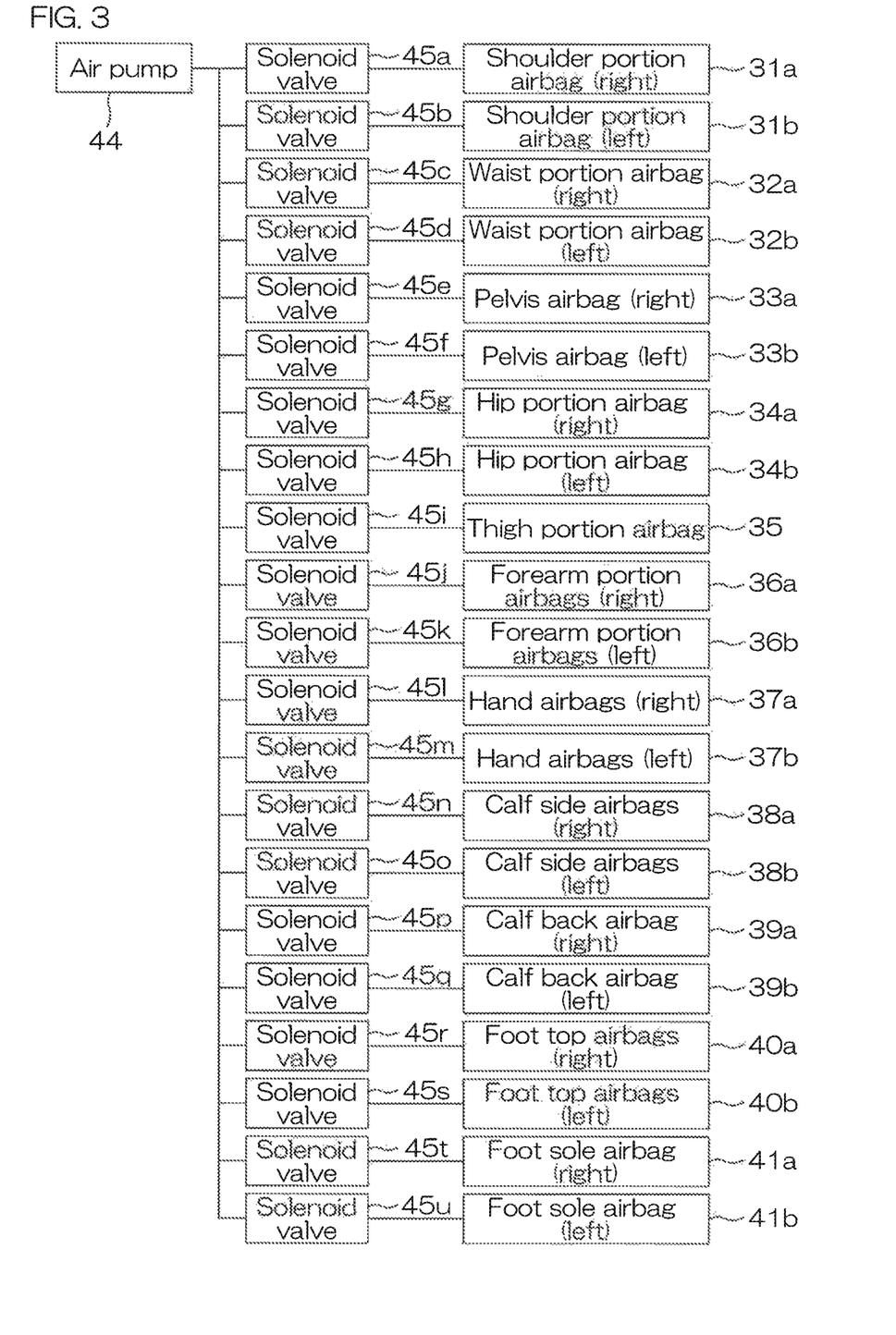
FIG. 3 is an air circuit diagram of an air circuit from an air pump to respective airbags.

FIG. 2 is a block diagram of the electrical configuration of the massage system. FIG. 3 is an air circuit diagram of an air circuit from an air pump to the respective airbags.

Referring to FIG. 2, a controller 50, arranged to control the chair type massage machine 2, the head mounted display 3, and the headphones 4, is incorporated in an interior of the chair type massage machine 2. The controller 50 includes a microcomputer, a video display processor (VDP), and an audio signal processor. The microprocessor includes a CPU, a memory (RAM, ROM, or nonvolatile memory) 51, etc. In addition to a program for the CPU, various data are stored in the memory 51.

The remote 25, the head mounted display 3, and the headphones 4 are connected to the controller 50. Further, a drive circuit 61 of the massage unit 21, a drive circuit 62 of the backrest rotating actuator 22, a drive circuit 63 of the ottoman rotating actuator 23, a drive circuit 64 of the air pump 44, and a drive circuit 65 of a plurality of solenoid valves 45*a* to 45*u* are connected to the controller 50. Air from the air pump 44 is supplied to each of the solenoid valves 45*a* to 45*u*. In the following, the solenoid valves 45*a* to 45*u* may be referred to collectively as solenoid valves 45.

Referring to FIG. 3, the right shoulder portion airbag 31*a* is connected to the solenoid valve 45*a* and the left shoulder portion airbag 31*b* is connected to the solenoid valve 45*b*. The right waist portion airbag 32*a* is connected to the solenoid valve 45*c* and the left waist portion airbag 32*b* is connected to the solenoid valve 45*d*. The right pelvis airbag 33*a* is connected to the solenoid valve 45*e* and the left pelvis airbag 33*b* is connected to the solenoid valve 45*f*. The right hip portion airbag 34*a* is connected to the solenoid valve 45*g* and the left hip portion airbag 34*b* is connected to the solenoid valve 45*h*. The thigh portion airbag 35 is connected to the solenoid valve 45*i*.

The forearm portion airbags 36*a* for the right arm are connected to the solenoid valves 45*j* and the forearm portion airbags 36*b* for the left arm are connected to the solenoid valves 45k. The right hand airbags 37a are connected to the solenoid valves 45l and the left hand airbags 37b are connected to the solenoid valves 45m.

The right calf side airbags 38a are connected to the solenoid valves 45n and the left calf side airbags 38b are connected to the solenoid valves 45o. The right calf back airbag 39a is connected to the solenoid valve 45p and the left calf back airbag 39b is connected to the solenoid valve 45q. The right foot top airbags 40a are connected to the solenoid valves 45r and the left foot top airbags 40b are connected to the solenoid valves 45s. The right foot sole airbag 41a is connected to the solenoid valve 45t and the left foot sole airbag 41b is connected to the solenoid valve 45u.

Although in the present preferred embodiment, a solenoid valve is provided individually for each of airbags disposed as a pair at respective right and left sides, a single solenoid valve in common may instead be provided for two airbags disposed as a pair.

When the solenoid valve 45 of a certain airbag is excited, air is supplied to the airbag from the air pump 44 via the solenoid valve 45. The airbag is thereby inflated. And when the solenoid valve 45 of the airbag is de-excited, the air inside the airbag is exhausted to the exterior via the solenoid valve. The airbag is thereby shrunk.

As operation modes of the chair type massage machine 2, there are basically an ordinary mode, in which a massage is performed without displaying a moving image on the head mounted display 3, and a virtual reality mode (VR mode), in which a massage is performed while displaying a moving image on the head mounted display 3. With the ordinary mode, there is an automatic mode and a manual mode. In the automatic mode, the massage is performed in accordance with a massage course selected by the person to be treated. In the manual mode, the massage is performed in accordance with a massage type selected by the person to be treated. Operations of the chair type massage machine 2 in the ordinary mode are well-known and therefore description thereof shall be omitted.

In the VR mode, the head mounted display 3 and the headphones 4 are worn by the person to be treated and the massage is performed by the chair type massage machine 2 while making the person to be treated view a moving image and listen to audio. With the present preferred embodiment, a plurality of types of VR mode massage courses are prepared. And in the VR mode, the massage is performed in accordance with the VR mode massage course selected by the person to be treated and a moving image and audio that are in accordance with the massage course are presented. In the present preferred embodiment, the ottoman 14 is set in a horizontal orientation in the VR mode.

A plurality of types of ordinary mode massage programs that are in accordance with a plurality of types of ordinary mode massage courses and a plurality of types of VR mode massage programs that are in accordance with the plurality of types of VR mode massage courses are stored in the memory 51. Also, a plurality types of video data and audio data that are in accordance with the plurality of types of VR mode massage courses are stored in the memory 51.

The video data that are in accordance with a massage course include, in relation to at least one type of massage included in the massage course, video data for visually obtaining a sensation as if the massage is being applied by a human being. Specifically, the video data that are in accordance with a massage course include, in relation to at least one type of massage included in the massage course, video data (virtual reality video data) for making the head mounted display 3 display a video that includes a moving image of a virtual practitioner performing the massage during application of the massage. In the present preferred embodiment, the moving image of the virtual practitioner is a virtual video that is as if viewed by the person to be treated who is being treated.

Figure 4:
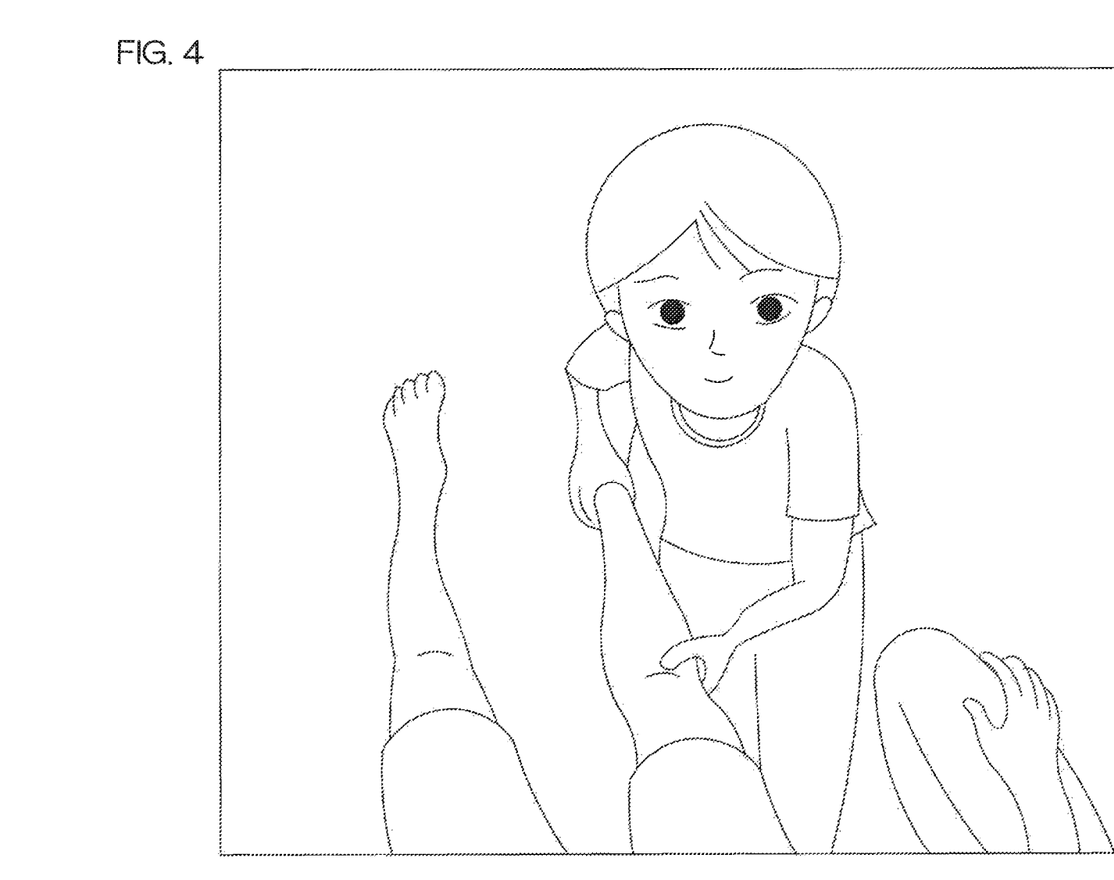
FIG. 4 is a schematic view of an example of a moving image that includes a virtual practitioner.

An example of a moving image that includes a virtual practitioner is shown in FIG. 4. The moving image of FIG. 4 is a video that is displayed when a massage is being performed on a right leg portion of the person to be treated in a state where the ottoman 14 is in a substantially horizontal orientation and includes a moving image of the virtual practitioner (person of an animation) massaging the right leg portion of the person to be treated. The moving image of the virtual practitioner may be an animation (CG (computer graphics) animation) produced with a computer or may be an ordinary animation. Also, the moving image of the virtual practitioner may be a live-action moving image.

The audio data are, for example, audio data for performing audio output of speech lines by the virtual practitioner, displayed on the head mounted display 3, from the headphones 4. As the speech lines, speech lines, such as "Is this relaxing?" etc., may be cited. Besides such audio data of speech lines, the audio data may also include audio data of music. Also, the audio data may be audio data of just music and not include audio data of speech lines.

In the present preferred embodiment, a plurality of types of video data and audio data, with which the character (role, person) of the virtual practitioner differs, are prepared for the respective VR mode massage courses.

An operation example of the massage system 1 in the VR mode shall now be described.

Figure 5A:
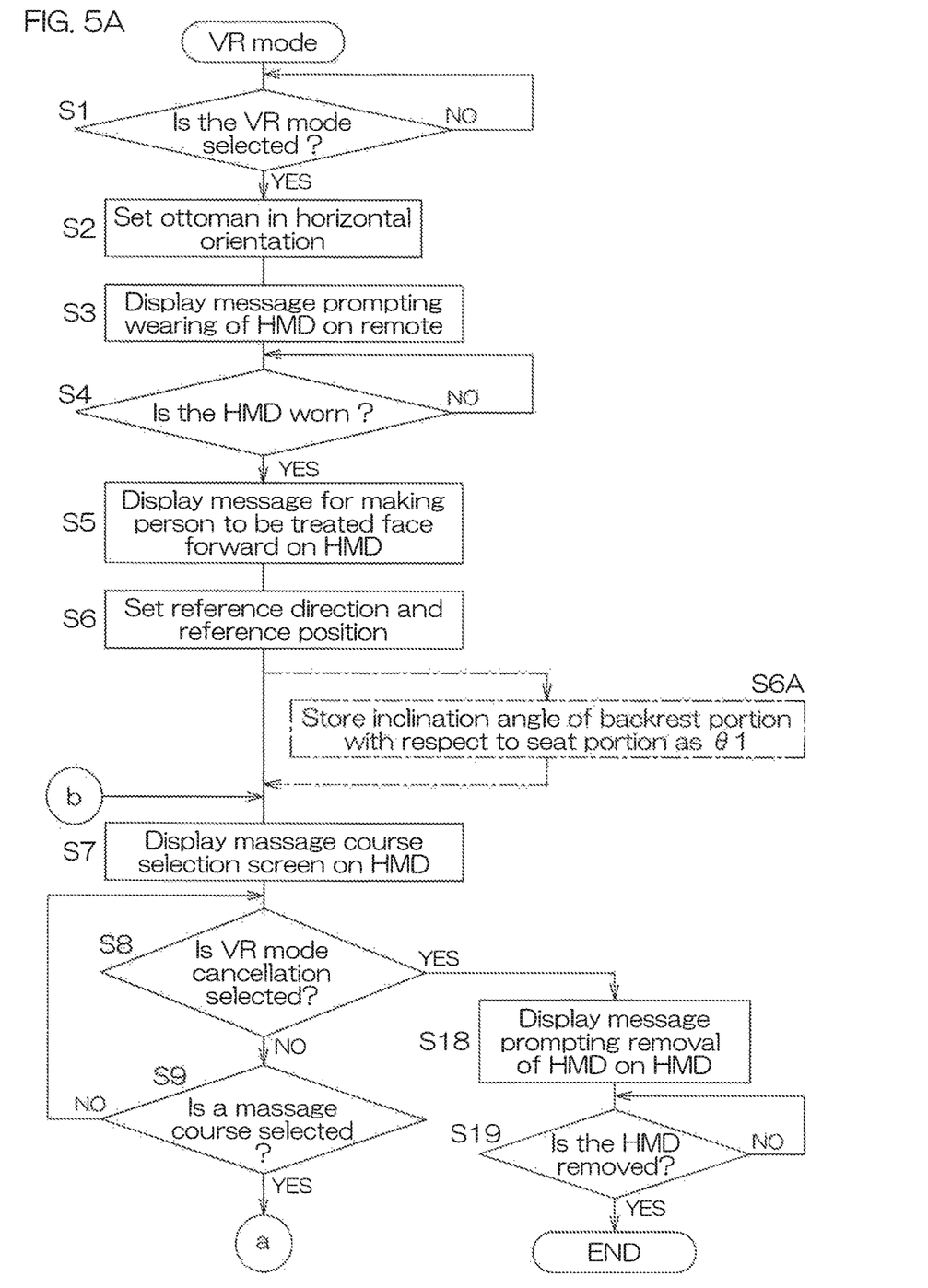
FIG. 5A is a flowchart of a portion of operations of a controller when a VR mode is selected.
Figure 5B:
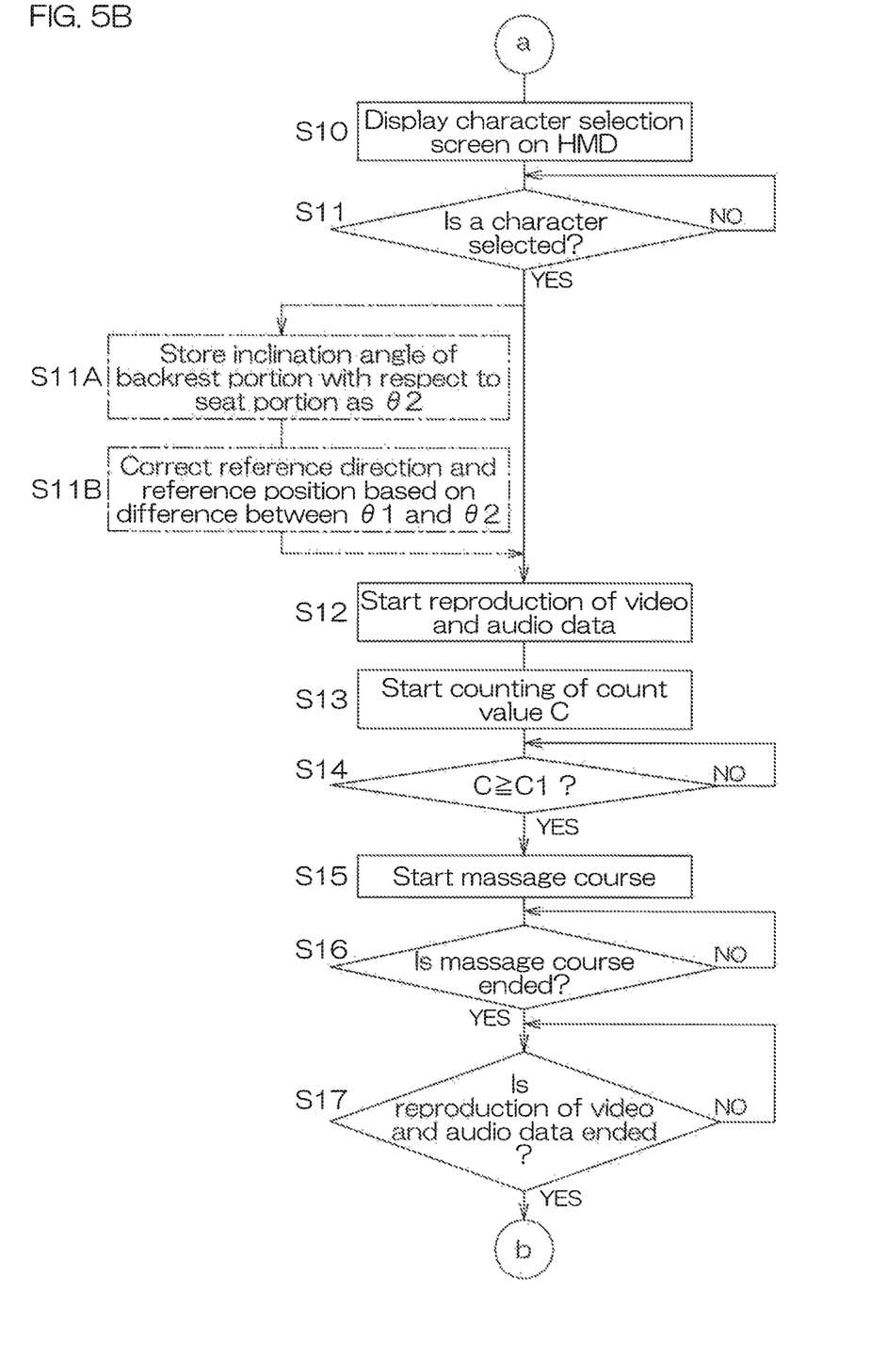
FIG. 5B is a flowchart of a portion of operations of the controller when the VR mode is selected.

FIG. 5A and FIG. 5B are flowcharts of operations of the controller 50 when the VR mode is selected.

If the person to be treated wishes to receive a massage in the VR mode, the person operates the remote 25 and selects the "VR mode."

When the "VR mode" is selected (step S1: YES), the controller 50 controls the ottoman rotating actuator 23 to set the ottoman 14 in the horizontal orientation (step S2). Also, the controller 50 displays, on the liquid crystal display 26 of the remote 25, a message for prompting the wearing of the head mounted display (HMD) 3 and the headphones 4 on the head portion (step S3). In accordance with this message, the person to be treated wears the head mounted display 3, with the headphones 4, on the head portion.

The head mounted display 3 is provided with a wearing sensor (not shown) that detects that the head mounted display 3 is worn on the head portion of the person to be treated and a detection signal of the wearing sensor is arranged to be provided to the controller 50. The controller 50 can thus determine whether or not the head mounted display 3 is worn on the head portion based on the detection signal of the wearing sensor. When the head mounted display 3 is removed, the controller 50 can determine whether or not the head mounted display 3 is removed from the head portion based on the detection signal of the wearing sensor.

When the head mounted display 3 is worn by the person to be treated (step S4: YES), the controller 50 displays, on the head mounted display 3, a message for making the person to be treated face forward (step S5). The message is constituted, for example, of the message: "Please face forward." The person to be treated faces forward in accordance with the message. After a few seconds from the display of the message, the controller 50 sets the current direction (face direction) and the position of the head mounted display 3 respectively as a reference direction for head tracking and a reference position for position tracking (step S6).

Thereafter, the controller 50 displays a massage course selection screen on the head mounted display 3 (step S7). The massage course selection screen is a screen arranged to make the person to be treated select a massage course or cancel the VR mode. A plurality of VR mode massage course selection items and a VR mode cancellation selection item are displayed in the massage course selection screen. The person to be treated, for example, moves a cursor, displayed inside the course selection screen, by moving the head to select the massage course of choice or cancellation of the VR mode.

If the VR mode cancellation is not selected (step S8: NO) and a massage course is selected (step S9: YES), the controller 50 displays a character selection screen on the head mounted display 3 (step S10). The character selection screen is a screen arranged to make the person to be treated select the character of the virtual practitioner and images of a plurality of types of characters are displayed. The person to be treated, for example, moves a cursor, displayed inside the character selection screen, by moving the head to select the character of choice.

When the character is selected (step S11: YES), the controller 50 selects video data and audio data specified by the massage course selected in step S9 and the character selected in step S11 and starts reproduction of the data (step S12). Also, the controller 50 starts counting of a count value C (step S13).

When the reproduction of the video data is started, a reproduced video image is displayed three-dimensionally on the head mounted display 3. In the present preferred embodiment, first, the character (the virtual practitioner) appears and a self-introduction and an explanation of precautions are performed. As the precautions, for example, not standing up while wearing the head mounted display 3, etc., can be cited.

When the count value C reaches a predetermined value C1 (step S14: YES), the controller 50 makes the chair type massage machine 2 start a massage that is in accordance with the massage course selected in step S9 (step S15). The predetermined value C1 is set to a value corresponding to the time required by the character to perform the self-introduction and the explanation of precautions. Therefore, the massage in accordance with the massage course is started immediately after the self-introduction and the explanation of precautions by the character ends.

The person to be treated is thereby made to receive the massage while viewing the video image displayed on the head mounted display 3. In this process, depending on the type of massage, a video image that includes a moving image of the virtual practitioner performing the massage is displayed in synchronization with the massage, for example, as shown in FIG. 4. The person to be treated can thereby visually obtain a sensation as if being treated by a human being. Also, if audio of the virtual practitioner is included in the audio data, the person to be treated hears the audio of the virtual practitioner, etc., output from the headphones 4. The person to be treated can thereby also audibly obtain a sensation as if being treated by a human being. That is, in comparison to the ordinary mode, the person to be treated can readily obtain the sensation as if being treated by a human being in the VR mode. Therefore, in comparison to the ordinary mode, a high relaxation effect can be anticipated with the VR mode.

Thereafter, when the massage course ends (step S16: YES) and the reproduction of the video data and the audio data corresponding to the massage course ends (step S17: YES), the controller 50 returns to step S7 and displays the massage course selection screen on the head mounted display 3.

If the person to be treated wishes to receive a massage in the VR mode further, the person selects a massage course on the massage course selection screen. In this case, a positive judgment is made in step S9 and therefore the processes from step S10 onward are executed again. On the other hand, if the VR mode is desired to be canceled, the person to be treated selects the VR mode cancellation on the massage course selection screen.

If the VR mode cancellation is selected (step S8: YES), the controller 50 displays, on the head mounted display 3, a message for prompting the removing of the head mounted display 3 and the headphones 4 from the head portion (step S18). In accordance with this message, the person to be treated removes the head mounted display 3, with the headphones 4, from the head portion.

When the head mounted display 3 is removed from the head portion (step S19: YES), the controller 50 ends the current process in the VR mode.

There may be a case where the person to be treated operates the remote 25 to move the backrest portion 12 to change a basic posture when receiving the massage (hereinafter referred to as the "basic posture during treatment") at some point between the setting of the reference direction and the reference position are set in step S6 and the selection of the character in step S10. If so, the direction (face direction) and position of the head mounted display 3 at the basic posture during treatment will not be matched with the reference direction and reference position set in step S6. Thus, in such a case, step S6A, step S11A, and step S11B, indicated by dot-dashed lines in FIG. 5A and FIG. 5B, may be added so that the direction and position of the head mounted display at the basic posture after the change are set as the reference direction and the reference position.

Specifically, when setting the reference direction and the reference position in step S6, the controller 50 detects an inclination angle of the backrest portion 12 with respect to the seat portion 11 and stores the angle as a first inclination angle $\theta 1$ (step S6A). Also, the controller 50 detects the inclination angle of the backrest portion 12 with respect to the seat portion 11 after the character has been selected and before the reproduction of the video data and the audio data is started (between steps S11 and S12) and stores the angle as a second inclination angle $\theta 2$ (step S11A). Then, if the second inclination angle $\theta 2$ differs from the first inclination angle $\theta 1$, the controller 50 corrects, based on the difference between the second inclination angle $\theta 2$ and the first inclination angle $\theta 1$, the reference direction and the reference position set in step S6 to be of values that are in accordance with the current posture of the person to be treated (basic posture during treatment) (step S11B). The inclination angle of the backrest portion 12 with respect to the seat portion 11 may be detected by detecting an operation amount (for example, a motor rotation angle) of the backrest rotating actuator 22, etc.

When the second inclination angle $\theta 2$ differs from the first inclination angle $\theta 1$, that is, when the basic posture during treatment is changed, it is preferable for the controller 50 to further perform a process such as the following. That is, it is preferable for the controller 50 to correct, in accordance with the second inclination angle $\theta 2$, a video image of a chair (the massage machine 1) and a video image of an avatar (the character expressing the person to be treated) that are included in the moving image displayed after the start of reproduction to be video images such as viewed by the person to be treated in the basic posture during treatment after the change.

Although in the preferred embodiment described above, the ottoman 14 is put in the horizontal orientation in the VR mode (see step S2), the ottoman 14 does not have to be put in the horizontal orientation in the VR mode.

If specifications are arranged such that when an air massage using the airbags 31a to 41b is being performed in the VR mode, the person to be treated can change the strength of the massage, the following problem may occur. Such change of massage strength is performed, for example, by operating the remote 25.

Adjustment of the strength of an air massage is generally performed by adjusting an air supplying time (solenoid valve exciting time) when inflating an airbag. If the air supplying time when inflating an airbag is lengthened, the amount of air supplied to the airbag is increased and therefore a force by which a treated portion is pressed by the airbag is strengthened. On the other hand, if the air supplying time when inflating the airbag is shortened, the amount of air supplied to the airbag is decreased and therefore the force by which the treated portion is pressed by the airbag is weakened. That is, the longer the air supplying time when inflating the airbag, the greater the strength of the air massage.

When in such a case where the strength of an air massage is adjusted by means of the air supplying time when inflating an airbag, the strength of a certain air massage is changed while the air massage is being performed, the time required for the air massage changes. That is, when the strength of an air massage is increased, the time required for the air massage is lengthened and when the strength of the air massage is decreased, the time required for the air massage is shortened. When the time required for an air massage changes, the air massage and the movement of the virtual practitioner in the moving image may fall out of synchronization. Thus, when, in the VR mode, the strength of an air massage is changed during the air massage, the controller 50 preferably adjusts the reproduction speed of the video data to synchronize the air massage and the movement of the virtual practitioner in the moving image. The change of reproduction speed of the video data may be performed, for example, by thinning out frames or interpolating frames.

Figure 6:
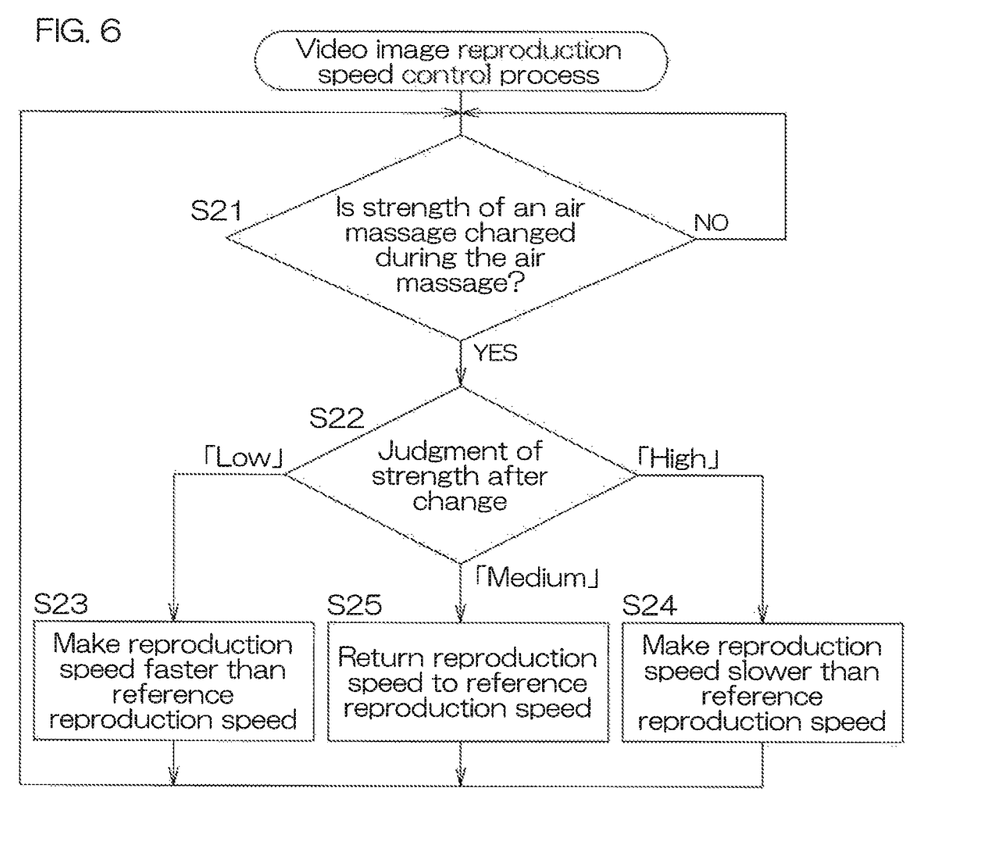
FIG. 6 is a flowchart of a procedure of a video image reproduction speed control process performed by the controller in accompaniment to a change of strength of an air massage.

FIG. 6 is a flowchart of a procedure of a video image reproduction speed control process performed by the controller 50 in accompaniment to a change of strength of an air massage. This process is performed when a massage course is being executed in the VR mode.

With the present preferred embodiment, it shall be deemed that the strength of an air massage is of the three stages of "low," "medium," and "high," at the start of each air massage, its strength is set to medium. And, with the present preferred embodiment, the video data are prepared on the premise that the strength of an air massage is set to "medium." When the strength of an air massage is set to "medium," the video data are reproduced as they are. The reproduction speed in this case shall be referred to as a reference reproduction speed. When each air massage is started in the VR mode, an initial value of its strength is set to "medium."

When a massage course is being executed in the VR mode, the controller 50 monitors whether or not the strength of an air massage is changed during the air massage (step S21). If the strength of an air massage is changed during the air massage (step S21: YES), the controller 50 judges the strength after the change (step S22). If the strength after the change is "low" (step S22: "Low"), the reproduction speed of the video data, corresponding to a remaining period of application of the air massage being applied, is made faster than the reference reproduction speed (the reproduction time is made shorter) (step S23). Specifically, the controller 50 thins out frames of the moving image, corresponding to the remaining period of application of the air massage being applied, to perform reproduction while decreasing the number of frames. In this process, it is preferable to increase the audio reproduction speed without changing the tone interval of the audio. A return to step S21 is then performed.

If in step S22, the strength after the change is judged to be "high" (step S22: "High"), the reproduction speed of the video data, corresponding to the remaining period of application of the air massage being applied, is made slower than the reference reproduction speed (the reproduction time is made longer) (step S24). Specifically, the controller 50 interpolates frames of the moving image, corresponding to the remaining period of application of the air massage being applied, to perform reproduction while increasing the number of frames. In this process, it is preferable to decrease the audio reproduction speed without changing the tone interval of the audio. A return to step S21 is then performed.

If in step S22, the strength after the change is "medium" (step S22: "Medium"), the reproduction speed of the video data, corresponding to the remaining period of application of the air massage being applied, is returned to the reference reproduction speed (step S25). Specifically, the controller 50 reproduces the moving image, corresponding to the remaining period of application of the air massage being applied, as is done ordinarily. In this process, it is preferable to return the audio reproduction speed to the ordinary reproduction speed. A return to step S21 is then performed.

By performing a reproduction speed control process, such as described above, an air massage and the movement of the virtual practitioner in the moving image can be synchronized even when the strength of the air massage is changed during the air massage.

If the strength of an air massage is changed not by changing the supplying time of air to an airbag but is changed by changing an output of the air pump 44, the time of the air massage does not change and therefore there is no need to adjust the reproduction speed of the moving image. Also, if an air amount adjusting valve, arranged to adjust the air supplying amount, is provided between the air pump 44 and the solenoid valves 45 and the strength of an air massage is changed by controlling the air amount adjusting valve, there is no need to adjust the reproduction speed of the moving image.

Although a preferred embodiment of the present invention has been described above, the present invention may also be implemented in yet other modes. Although in the preferred embodiment described above, the display device, on which the video image, including the moving image of the virtual practitioner, is displayed, is a head worn type display device (head mounted display) that can be worn on the head of the person to be treated, it may instead be a display device of a type that is not worn on the head of the person to be treated. Specifically, the display device may be a projector that projects the video image on a wall, etc., or may be a spherical display, arranged with an organic EL display, etc., or may be a dome type (bell type) display device, disposed so as to cover a head portion of the person to be treated and having a display surface on an inner surface.

Also, with the preferred embodiment described above, a display that includes the head tracking function and the position tracking function is used as the head mounted display 3. However, the head mounted display 3 may be that which includes just one function among the head tracking function and the position tracking function or that which does not include either function. Also, the head mounted display 3 may be that which does not include the function of displaying the moving image three-dimensionally, that is, the display may be that which displays the moving image two-dimensionally.

Also, although with the preferred embodiment described above, the massage machine 2 is a chair type massage machine, the massage machine 2 may be a massage machine besides that of a chair type.

The present application corresponds to Japanese Patent Application No. 2017-39780 filed on Mar. 2, 2017 in the Japan Patent Office, and the entire disclosure of this application is incorporated herein by reference.

While preferred embodiments of the present invention have been described above, it is to be understood that variations and modifications will be apparent to those skilled in the art without departing the scope and sprit of the present invention. The scope of the present invention, therefore, is to be determined solely by the following claims.

What is claimed is:

1. A massage system comprising:
a massage machine that is adapted to perform a massage on a person to be treated;
a display device;
a controller for controlling the massage machine and the display device,
wherein the controller is programmed to start the massage machine according to a massage course and to display an image corresponding to the massage course on the display device, after the massage course is selected,
the image includes a moving image of a virtual practitioner performing the massage;
wherein the display device is a head worn type display device that is adapted to be worn on a head portion of the person to be treated;
wherein the massage machine includes a seat portion and a backrest portion tiltably attached to the seat portion;
the head worn type display device includes a head tracking function and a position tracking function;
the controller displays, on the display, a message for making the person to be treated face forward when the display is worn by the person to be treated,
after a predetermined time from the display of the message, the controller sets a current direction and a position of the display respectively as a reference direction for head tracking and a reference position for position tracking, and detects an inclination angle of the backrest portion with respect to the seat portion and stores the angle as a first inclination angle,
the controller detects the inclination angle of the backrest portion with respect to the seat portion right before the reproduction of the video is started and stores the angle as a second inclination angle, and
when the second inclination angle differs from the first inclination angle, the controller corrects, based on a difference between the second inclination angle and the first inclination angle, the reference direction and the reference position to be of values that are in accordance with the current posture of the person to be treated.

2. The massage system according to claim 1, wherein the display device displays the video image three-dimensionally.

3. The massage system according to claim 1, wherein the virtual practitioner displayed on the display device is an animated figure.

4. The massage system according to claim 1, wherein the massage machine includes a function of performing an air massage using one or a plurality of airbags that are inflated and shrunk by supply and exhaust of air and a function of changing a supplying time of air to a certain airbag among the one or plurality of airbags to control the strength of the air massage using the airbag, and
the controller is programmed to control a reproduction speed of the video to synchronize with the massage when the strength of the air massage is changed during performing of an air massage using a certain airbag among the one or plurality of airbags.

* * * * *